United States Patent
Braun

(10) Patent No.: US 6,820,409 B2
(45) Date of Patent: Nov. 23, 2004

(54) GAS-TURBINE POWER PLANT

(75) Inventor: Jost Braun, Waldshut-Tiengen (DE)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/157,395

(22) Filed: May 30, 2002

(65) Prior Publication Data
US 2002/0189261 A1 Dec. 19, 2002

(30) Foreign Application Priority Data
May 31, 2001 (CH) .................................... 2001 1002/01

(51) Int. Cl.$^7$ ............................ F02C 7/08; F02G 1/00; F02G 3/00
(52) U.S. Cl. ...................................................... 60/39.5
(58) Field of Search ............................ 60/39.182, 39.5, 60/791

(56) References Cited

U.S. PATENT DOCUMENTS 2,926,493 A * 3/1960 Poole et al. ............. 60/39.182
4,166,477 A  9/1979 Duthion et al.
5,160,080 A * 11/1992 Hines et al. .................. 60/791
5,642,614 A * 7/1997 Bozzuto et al. .......... 60/39.182
6,050,084 A * 4/2000 Schutz et al. ................ 60/39.5
6,298,655 B1 * 10/2001 Lee et al. ................ 60/39.182

FOREIGN PATENT DOCUMENTS

| DE | 2203477 | 8/1973 |
| DE | 2926366 | 1/1981 |
| DE | 19905818 A1 | 8/2000 |
| DE | 19961540 A1 | 12/2000 |
| GB | 2133175 A | 7/1984 |

* cited by examiner

*Primary Examiner*—Michael Koczo
(74) *Attorney, Agent, or Firm*—Cermak & Kenealy LLP; Adam J. Cermak

(57) ABSTRACT

A method of operating a gas-turbine power plant is described, having a gas-turbine plant (1) in which an oxygen-containing gas is drawn in, compressed and fired and, after passing through a turbine stage, is fed as discharging hot gas (8) to a waste heat boiler (4), from which the cooled exhaust gas (9) is fed to an outlet (10) and then to the free atmosphere. The invention is characterized in that a specific reduction in the flow velocity with which the exhaust gas (9) flows through the outlet (10) is effected in the region of the latter, with a simultaneous pressure increase downstream in the outlet (10), and in that the pressure conditions occurring inside the outlet (10) are transmitted free of losses between the gas turbine (1) and the outlet (10) via a gas-tight flow path of the hot and exhaust gases (8; 9).

3 Claims, 3 Drawing Sheets

GAS-TURBINE POWER PLANT

FIELD OF THE INVENTION

The invention relates to a method of operating a gas-turbine power plant, essentially comprising a device for compressing an oxygen-containing gas, at least one combustion chamber for heating the compressed gas, at least one gas turbine in which the hot gas produced is expanded to perform work, a flow path in which the expanded hot gas, if need be while passing a number of further working stages for energy and/or material recycling, such as, for example, a waste heat boiler for the generation of steam, is fed to an outlet into the atmosphere. Furthermore, the invention relates to a corresponding gas-turbine power plant.

DESCRIPTION OF RELATED ART

A gas-turbine power plant of the generic type is described in publication DE 199 05 818 A1, this gas-turbine power plant providing a stationary gas turbine which has an open cycle and in which the atmospheric circulating air is drawn in, compressed, mixed with fuel and ignited, and the hot gases produced in the process are expanded in a turbine stage and are then directed into a waste heat boiler for further recycling of the inherent thermal energy.

The output of a gas-turbine power plant also depends to a certain extent on the losses in the flow path of the hot gases. Firstly, the output is reduced by exhaust-gas pressure losses in the downstream plants. Secondly, the exhaust gases largely recycled thermally discharge via the stack into the atmosphere with flow velocities of 10 m/s to 30 m/s, that is to say with a considerable content of kinetic energy.

To increase the overall efficiency of the gas-turbine power plant known per se, it is proposed in the abovementioned publication to utilize the kinetic energy of the thermally recycled exhaust gas flowing through the outlet of the waste heat boiler. To this end, a fluid-flow prime mover which is designed like a turbine as used occasionally for utilizing wind power is provided inside the outlet designed as a stack. Such a fluid-flow prime mover has propeller or turbine rotors which are set in rotation inside the outlet when subjected to the flow of the exhaust gas. To generate electricity, the rotor shaft of such a fluid-flow prime mover is connected to a generator, which is driven in a similar manner to a wind power plant, so that electrical energy can accordingly be obtained from the loss of flow energy.

A disadvantage of this known apparatus for utilizing the kinetic energy inherent in the exhaust gas is the relatively high complexity of the fluid-flow machine provided in the outlet region of the stack, this fluid-flow machine additionally being subject to a high maintenance cost and comparatively high investment costs. In addition, typical fluid-flow machines for the flow conditions present inside the stack, with flow velocities of between 10 m/s and 30 m/s, generally have a markedly lower working potential than the gas turbine connected upstream in the flow, so that the energy conversion also takes place at an efficiency which tends to be lower than is possible in the upstream gas turbine.

SUMMARY OF THE INVENTION

In a development of the prior art, the object of the invention is to reduce the total pressure loss in the flow path of the exhaust gas between the discharge from the gas turbine and the entry into the atmosphere, in which case the reduced flow losses are to directly benefit the gas turbine as increased output.

According to the invention, the object is achieved by a method of operating a gas-turbine power plant and by a gas-turbine power plant of the type mentioned in the independent patent claims. The dependent claims reproduce advantageous embodiments of these inventions.

The basic idea of the inventions consists in utilizing the kinetic energy of the exhaust gas, discharging via an outlet into the atmosphere, specifically for producing a low pressure within the flow path of the exhaust gas and in maintaining this low pressure over the entire flow path downstream of the gas turbine in order to build up in this way a lower back pressure behind the turbine. In this way, the gas turbine does not have to perform work against atmospheric pressure or an even higher pressure—as is normal in conventional plants. The higher pressure difference available at the gas turbine as a result of this measure is reflected in an increased output and thus increased overall efficiency of the gas-turbine power plant.

The method according to the invention of operating a gas-turbine power plant, an oxygen-containing gas being drawn in, compressed and heated while admixing a fuel, and the hot gas produced being expanded in a gas turbine to perform work and then discharging from the gas turbine and being fed to an outlet via a flow path, is characterized according to the invention in that the hot-gas flow, at an essentially constant flow rate, is decelerated in the region of the outlet, and the pressure conditions produced as a result upstream of the region of the deceleration are transmitted back via the flow path of the hot gases up to the exit of the gas turbine.

A gas-turbine power plant designed for realizing this method is equipped with a diffuser unit in the region of the outlet, which as a rule is designed as a stack, by means of which diffuser unit the exhaust gas is decelerated in its flow velocity with low losses by means of a specific widening of the cross section of flow, in the course of which the pressure prevailing in the region of the decelerated exhaust gas increases. This in turn, relative to the atmospheric pressure which adjoins the diffuser unit downstream, leads to a considerable pressure reduction upstream of the diffuser unit inside the outlet. By the flow path between the turbine exit and the outlet equipped with the diffuser unit being at the same time designed so as to be gas-tight relative to the ambient pressure, the reduced pressure occurring upstream of the diffuser unit inside the outlet is able to spread right up to the turbine exit. Thus the gas turbine works against a lower back pressure, as a result of which the efficiency of the gas turbine can be increased inasmuch as the latter does not have to work against atmospheric pressure, as in the case of conventional gas-turbine plants of open design, but against a pressure level which is markedly reduced compared with the atmospheric pressure.

By means of suitable diffuser units, a selection (by no means exhaustive) of which is explained in the exemplary embodiments below with reference to the drawings, an energy recovery efficiency of over 70% can be achieved from the specific deceleration of the exhaust-gas velocity.

The overall efficiency, which is relatively high anyway, of a gas-turbine power plant known per se is further increased by the measure according to the invention for utilizing the kinetic energy inherent in the exhaust-gas flow, it not being necessary to use any technically complex, movable components susceptible to wear for realizing the increased technical overall efficiency, as is the case, for example, with a fluid-flow machine installed in the exhaust-gas duct.

In the process, the utilization of the kinetic energy directly benefits the generation of electricity with a relatively high efficiency. In this case, the relevant measures require low investment costs. The associated maintenance cost is exceptionally low. Finally, it is worth mentioning that the measures according to the invention for the technical utilization of the kinetic energy inherent in the exhaust gas can be integrated not only in plants to be newly erected but also, with an extremely low investment cost, in already existing plants.

BRIEF DESCRIPTION OF THE DRAWING

The invention is described by way of example below, without restricting the general idea of the invention, with the aid of exemplary embodiments and with reference to the drawings, in which.

DETAILED DESCRIPTION OF EMBODIMENTS OF THE INVENTION

Figure 1:
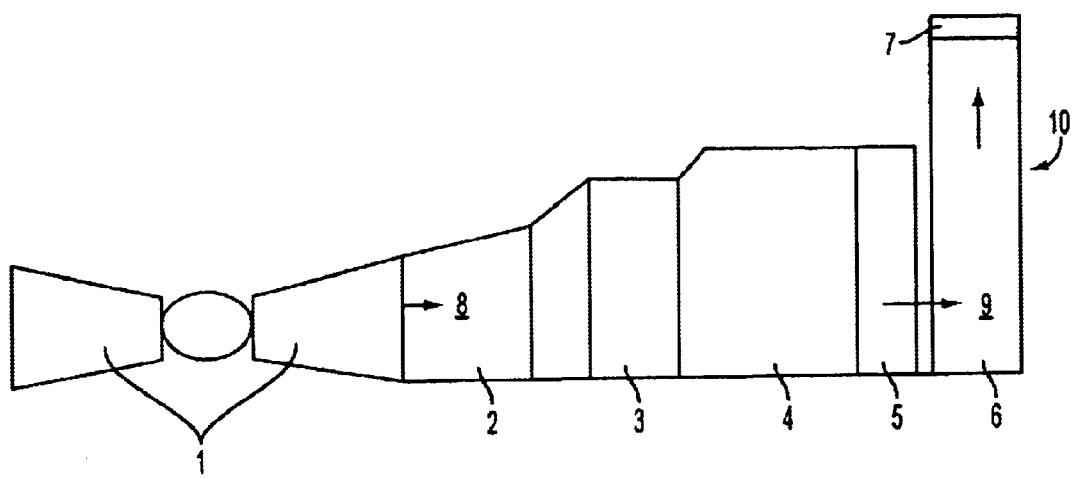
FIG. 1 shows a schematic overall view of a gas-turbine power plant designed according to the invention.

Shown in FIG. 1 in a highly schematic manner is a gas-turbine power plant which is designed like a combined-cycle plant or a cogeneration plant; that is to say that the hot gases leaving the gas turbine are thermally recycled in a waste heat boiler before being discharged into the atmosphere.

The stationary gas turbine 1, from its downstream region, discharges hot gases 8, which in modern plants may reach temperatures of over 600° C., which hot gases 8 pass through downstream process stages 2, 3 into a waste heat boiler 4 and discharge a proportion of the inherent thermal energy there by indirect heat transfer for the purpose of the generation of steam. The generated steam feeds a steam turbine or is utilized in another manner, which is not of interest in the context in question here.

The exhaust gas 9, largely recycled thermally, now passes via transition pieces 5 and 6 into the outlet 10, which is designed as a stack of approximately constant cross section of flow along its extent. As termination, the stack 10 is equipped according to the invention with a diffuser 7, which brings about a specific deceleration in the flow velocity.

A feature which all the diffusers 7 explained below have in common is the fact that they have no movable parts, as a result of which they can be manufactured in a technically and financially favorable manner on the one hand and they also require no maintenance or only little maintenance.

Figure 2:
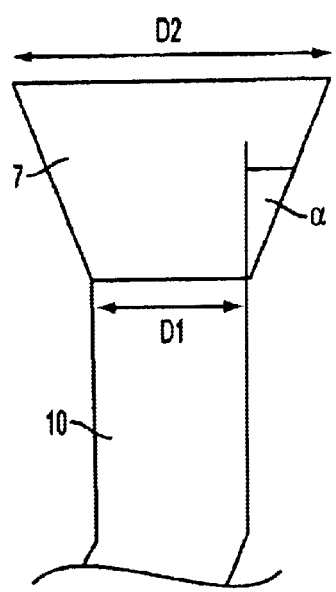
FIG. 2 shows a schematic representation of an axial diffuser.

A longitudinal section through a diffuser 7 directly attached to the outlet 10 in the direction of flow is shown in FIG. 2. As already explained, the stack 10 has an essentially uniform cross section of flow D1, adjoining which is a flow section, an "axial diffuser", widening conically to a cross section of flow D2. The axial diffuser 7 has an opening angle α which continuously widens the original cross section of flow D1 to the discharge cross section of flow D2. The flow velocity of the exhaust gas 9 is reduced in proportion to the increase in the cross section of flow, as a result of which the static pressure inside the axial diffuser 7 is increased. This in turn leads to a pressure reduction inside the flow region in the outlet 10. Of course, these effects occur only on the precondition that the flow does not separate from the flow-limiting wall to an appreciable degree. Therefore, the opening angle α of the diffuser 7 should not exceed a range of 5° to 7°. At larger opening angles, the flow losses caused by wall separation increase so much that the diffuser efficiency drops to a quantity that no longer permits any significant pressure recovery. On account of the gas-tight design of the flow path between the diffuser 7 and the exit of the gas turbine 1, the reduced pressure conditions are transmitted via the flow path virtually free of losses and become effective in the form of a reduced back pressure at the exit of the turbine 1.

Figure 3:
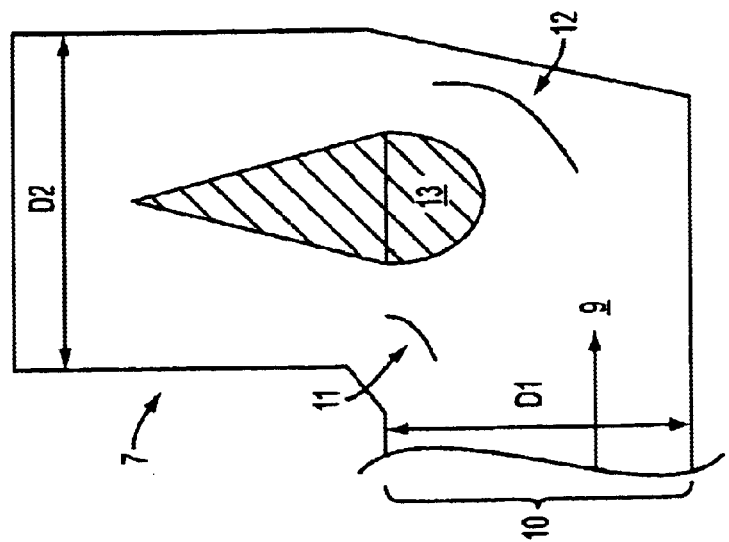
FIG. 3 shows a schematic representation of an axial diffuser arranged at an angle.

Shown in FIG. 3 is a further variant of an axial diffuser 7 in which the exhaust gas 9 flowing along the flow path of the outlet 10 is deflected by an angle, here 90°, by means of baffles 11, 12. Furthermore, a displacement body 13 is provided in the region of the deflected exhaust gas 9, the spatial form of this displacement body 13 being designed in such a way that the latter, in combination with the contour of the flow-limiting wall of the outlet 10, widens the cross section and thus exerts a decelerating effect on the flow velocity of the exhaust gas 9. Simultaneous coupling of the deceleration with a low-loss deflecting effect is possible with this type of construction and is to be aimed at. It goes without saying that, in this type of construction too, the flow conditions are to be taken into account in such a way that loss-inducing flow separation at the wall is largely prevented; the flow-limiting contours of the displacement body and of the outlet 10 thus assume an appropriately small opening angle relative to one another.

By the angled embodiment of the axial diffuser 7 shown in FIG. 3, it is possible to integrate the diffuser 7 as a compact construction unit in the interior of a stack or outlet 10 without changing its type of construction and in particular its external appearance. This type of construction is therefore especially suitable for new plants.

Figure 4:
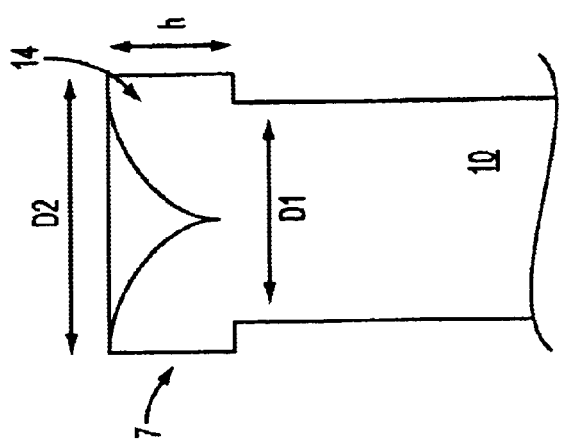
FIG. 4 shows a schematic representation of a radial diffuser.

Shown in FIG. 4 is a radially acting diffuser 7 which directly adjoins the outlet 10 in the direction of flow. The radial diffuser 7 has a constant increase in cross section of flow from $(D1)^2\pi/4$ to $(D2)\pi h$ and has deflecting surfaces 14 deflecting the exhaust-gas flow in the radial direction. The flow velocity of the exhaust gas passing through the radial diffuser 7 is reduced by specific radial outflow of the exhaust gas along the flow section h of the radial diffuser 7.

Figure 5:
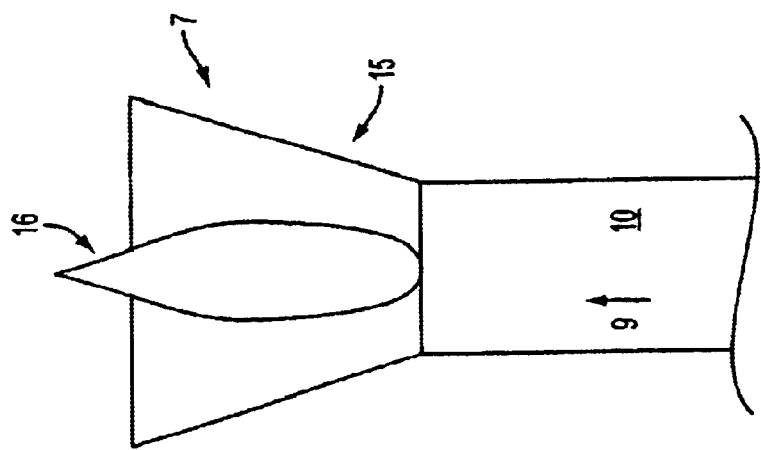
FIG. 5 shows a schematic representation of a semiaxial diffuser.

Shown in FIG. 5 is a "semiaxial diffuser" 7 which provides a flow section 15, widening in a funnel shape, on the outlet 10 in the direction of flow, in which flow section 15 a displacement body 16 is inserted centrally. Depending on its geometrical embodiment, the displacement body 16 is able to decelerate the exhaust gas 9, flowing through the flow section 15, in both the axial and radial directions.

Figure 6:
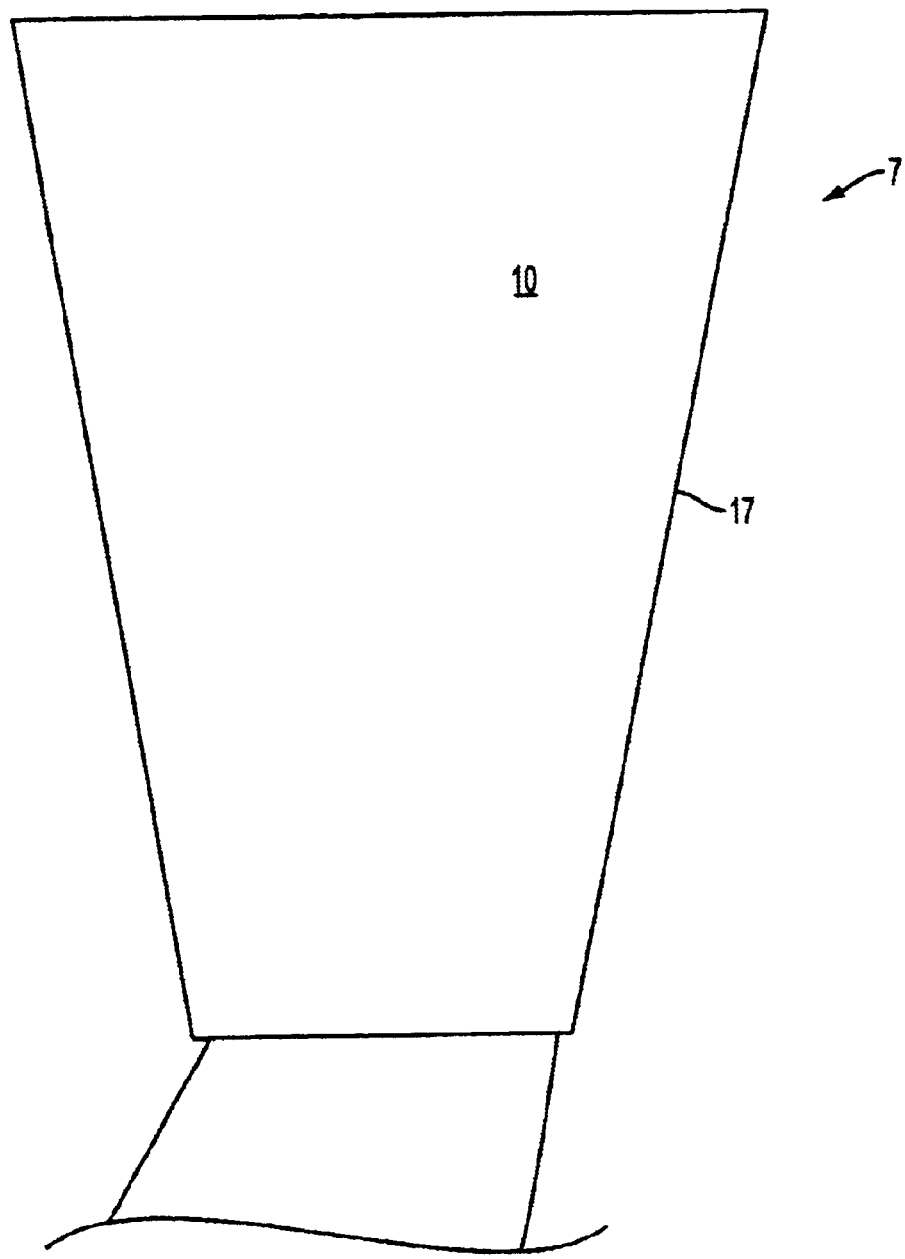
FIG. 6 shows a schematic representation of the outlet as the complete diffuser.

Finally, an embodiment of a diffuser unit 7 which extends over the entire length of the stack itself can be seen from FIG. 6. Here, the outlet or stack 10 is shown as a body 17 which widens in the direction of flow and along the flow path of which the exhaust gas is decelerated continuously by the cross section of flow increasing continuously.

All the diffuser units described above are based on the flow-dynamic principle of the specific reduction of the flow velocity with a simultaneous increase in the static pressure, a marked reduction in pressure occurring upstream of the diffuser unit, this reduction in pressure being specifically transmitted into the downstream region of the gas turbine, so that the back pressure applied at the turbine exit is reduced and thus the available pressure potential between turbine inlet and outlet is increased.

| List of designations | |
|---|---|
| 1 | Gas-turbine stage |
| 2 | Diffuser of the gas turbine |
| 3 | Transition piece, gas turbine, waste heat boiler |
| 4 | Waste heat boiler |
| 5, 6 | Transition piece to the outlet |
| 7 | Diffuser unit |
| 8 | Hot gas |
| 9 | Exhaust gas |
| 10 | Outlet, stack |
| 11, 12 | Baffles |
| 13 | Displacement body |
| 14 | Deflecting surfaces |
| 15 | Flow section |
| 16 | Displacement body |
| 17 | Stack. |

What is claimed is:

1. A gas-turbine power plant, comprising:

a device for compressing an oxygen-containing gas;

at least one combustion chamber for heating the compressed gas in fluid communication with said device for compressing;

an outlet in fluid communication with said at least one combustion chamber and including a flow-limiting wall;

a diffuser arranged at a position in the flow direction downstream of the outlet;

at least one gas turbine in fluid communication with said at least one combustion chamber and including a flow path, an exit, and working stages, in which turbine hot gas produced expands to perform work and is then transferred into the flow path in which it passes through the working stages, and discharged into the atmosphere via the outlet;

a displacement body integrated at least approximately centrally in the cross section of flow in the region of the outlet, the displacement body having a spatial form so that it achieves a diffuser effect in interaction with the flow-limiting wall; and wherein the flow path between the exit of the gas turbine and the outlet is essentially gas-tight relative to the atmosphere.

2. The gas-turbine power plant as claimed in claim 1, wherein the outlet comprises a stack with a substantially uniform cross section of flow, and the diffuser is mounted on the stack.

3. The gas-turbine power plant as claimed in claim 2, wherein the diffuser comprises an axial diffuser.

* * * * *